J. R. BARBER.
EXTENSION CAR STEP.
APPLICATION FILED NOV. 15, 1913.
1,106,614.  Patented Aug. 11, 1914.
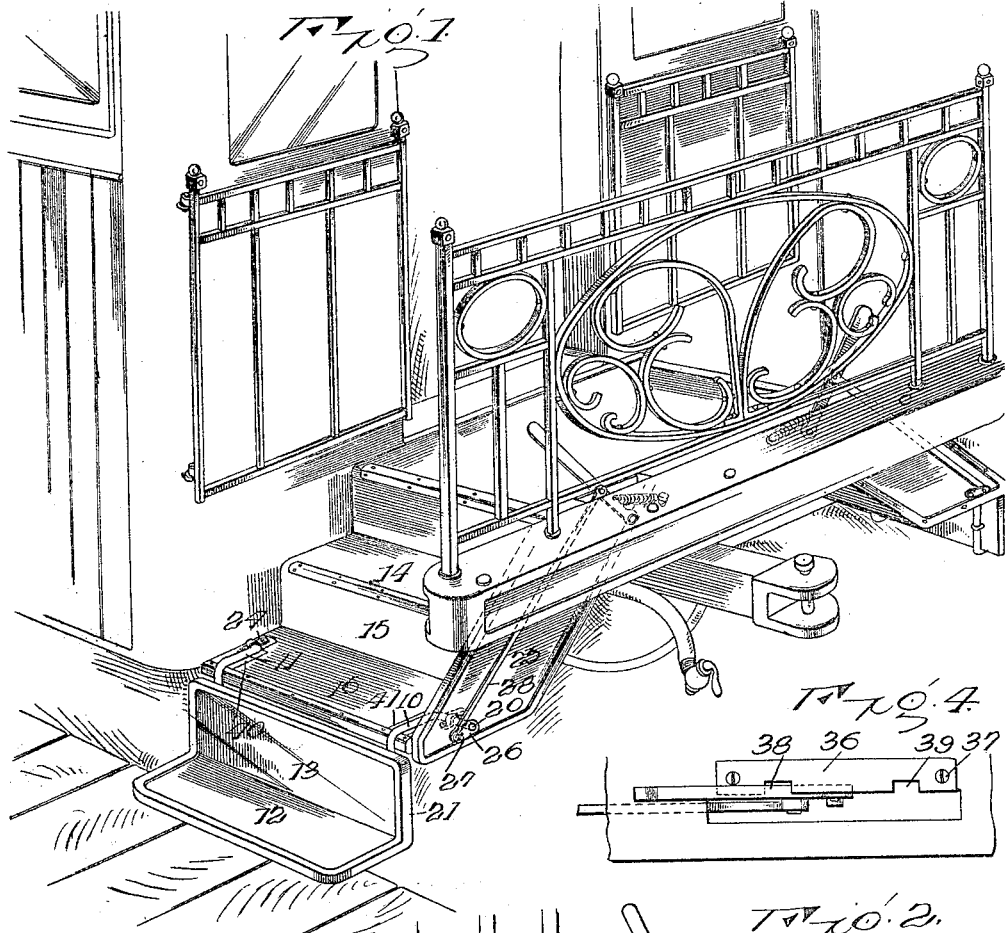
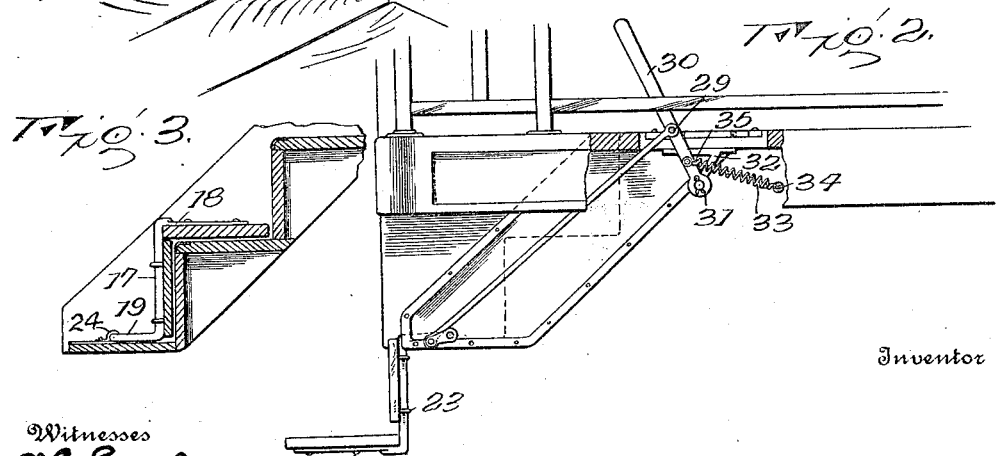
Witnesses  Inventor
  J. R. Barber
By
  Attorneys

UNITED STATES PATENT OFFICE.

JAMES R. BARBER, OF CEDARTOWN, GEORGIA.

EXTENSION CAR-STEP.

1,106,614.  Specification of Letters Patent.  Patented Aug. 11, 1914.

Application filed November 15, 1913. Serial No. 801,220.

*To all whom it may concern:*

Be it known that I, JAMES R. BARBER, citizen of the United States, residing at Cedartown, in the county of Polk and State of Georgia, have invented certain new and useful Improvements in Extension Car-Steps, of which the following is a specification.

The subject-matter of the present invention is directed to new and useful improvements in extension car steps, and has particular reference to that type of such devices as are employed in connection with the steps of Pullman cars and the like.

As its principal object, the present invention aims to provide an extension car step which may be manually operated from the platform of the car and may be swung outwardly and downwardly to afford passengers an easy entrance and exit from the cars without necessitating the employment of a porter's stool such as is customarily used.

A further object is to equip the step with a retractive spring so arranged that it will normally hold the step in folded position, and to interpose the spring in the operating mechanism so that as soon as the conductor or porter releases the operating mechanism, the spring will draw the step up into folded position.

The above and additional objects are accomplished by such means as are illustrated in the accompanying drawings, described in the following specification and then more particularly pointed out in the claims which are appended hereto and form a part of this application.

With reference to the drawings, wherein there has been illustrated the preferred embodiment of this invention as it is reduced to practice, and throughout the several views of which similar reference numerals designate corresponding parts, Figure 1 is a perspective view of the rear end of a Pullman car, illustrating the extension step of this invention as it is applied to the steps proper of the car platform. Fig. 2 is a detail view in side elevation of the steps proper and the extension step, portions of the rear platform being broken away to more clearly illustrate the operating means by which the extension step is folded and unfolded; Fig. 3 is a detail view in section showing the extension step in folded position against the steps proper; and Fig. 4 is a detail view in top plan of the clutch plate employed in holding the step operating lever in adjusted position.

Taking up in detail the description of the drawings, it will be noted upon reference to Fig. 1, in which the invention is best illustrated as an entirety, that the extension step consists in a pair of hanger bars 10 and 11 which carry a step tread and riser, and are pivotally mounted at their upper terminals to the lower tread of the car steps, so that the extension step proper may be swung upwardly in such manner that its tread 12 and riser 13 will respectively engage against the tread 14 and riser 15 of the car steps proper.

The hanger rods 10 and 11 are practically identical in construction, except that their pivoted terminals are oppositely disposed on the lowermost tread-board 16 of the car steps. It is deemed necessary, therefore, to describe only one of the hanger rods in detail. Each hanger rod is formed from a single length of steel tubing, although if so desired a solid metallic rod of any material may be employed. In forming the hanger rod, the tube is first bent to produce an L-shaped portion, one leg of which is indicated at 17 in Fig. 3, and the shorter leg of which is indicated at 18 in the same figure. Extending from the opposite terminal of the member 17 from the short leg 18 of the L portion, and at right angles to the member 17, is a straight arm 19 the extreme terminal of which is again bent at right angles, as at 20.

The tread 12 and the riser 13 of the extension step are arranged, of course, at right angles to each other, and are preferably held in the desired assembled relation by means of a substantially rectangular metallic frame 21 which is bent at the middle point and its opposite ends to conform to the edges of the members 12 and 13. The members 12 and 13 are respectively disposed against the portions 17 and 18 of the hanger rods and are supported thereby, as will be readily observed upon reference to Fig. 2. It will also be noted upon reference to this figure that the member 18 is flattened and is apertured to receive bolts 22, whereby the member 12 will be firmly held in fixed position. It will be further observed that U-bolts 23 are employed in holding the member 13 in proper position against the portion 17 of the hanger rods.

The arms 20 of the hanger rods are pivotally mounted within bearings 24 which are arranged on the lower tread 16 of the steps and at opposite ends thereof. The arm 20 of the hanger rod 10 is of sufficient length to project through the side-board 25 of the car steps so that it may receive a crank link 26. This crank link 26 is keyed onto the member 20 in any desired manner, and is apertured at its free end to receive a pivot pin 27 whereby it may be operatively connected to an operating link 28. The upper terminal of this operating link 28 is pivoted as at 29 in Fig. 2 to a point intermediate the length of a hand lever 30. This hand lever 30 is, as will be readily noted upon reference again to Figs. 1 and 2, pivoted at its lower terminal to a shaft 31 which is carried by a dependent bracket 32 which latter member is bolted or otherwise secured to the under face of the platform at the rear edge thereof.

From the foregoing description, it will be at once apparent that by manipulating the lever 30, the extension step which consists of the members 12 and 13 may be readily drawn up to dispose the member 12 on the tread 14, and the riser 13 against the riser 15, so that the car steps may be employed in the usual manner.

Inasmuch as the extension steps are designed for utilization only when the pullman is loading or unloading passengers at a station, it is, of course, desirable to have the extension step normally folded against the tread 14 and riser 15, as above set forth. There has, therefore, been provided a helical spring 33 which is of the retractive type. One terminal of this spring is fixed on a stud or plate 34, while the other terminal of the spring is equipped with a hook 35 which is adapted to be detachably secured to the lever 30 at an intermediate point between the members 29 and 31. The spring 33 is, as previously stated, of the retractive type, and obviously by exerting a pull on the lever 30 acts to normally hold the extension step in folded position on the car steps. However, in order to permit the conductor or porter of the pullman to swing the extension step down to unfolded position, as indicated in Fig. 1, and to fix the extension step in unfolded position against the tension of the spring 33 until it is again desired to fold the step, there has been provided a clutch plate which is designated as an entirety by the numeral 36.

Reference will now be had particularly to Fig. 4 in which the clutch plate is best illustrated. This member 36 consists preferably in an elongated metallic plate which is bolted or otherwise secured as at 37 to the rear edge of the car platform. The rear edge of the plate 36 is formed with a pair of longitudinally spaced notches indicated at 38 and 39. These notches 38 and 39 are designed to receive the lever 30 to hold it against movement. In this connection, it will, of course, be apparent that the pivoted terminal of the lever is loosely mounted on the pivoted shaft or pin 31, so that it may be swung into and out of the notches 38 and 39.

When it is desired to hold the extension step in unfolded position, the lever is thrown toward the side of the car, and is then swung to engage in the notch 38. The step will thus be held against return movement to folded position. When the operator desires to again fold the step up, it is only necessary to release the lever 30 from the notch 38 and the spring 33 will, through the medium of the connecting link 28, crank link 27 and arm 20, swing the extension step upwardly into folded position. The lever 30 is then again manipulated to dispose it within the notch 38, so that the spring 33 will be relieved of all strain of holding the step up, thus prolonging the life of the spring.

Referring now to Fig. 1, it will be noted that an extension step is, of course, provided for the steps at each side of the platform.

As a means for preventing the wearing of the lower tread 16 of the car step, such as would occur were the hanger rods 10 and 11 permitted to bite into the edge of the tread when the step is in extended position, there has been provided a pair of wear plates 40 and 41. These plates may be of any conventional design and material and are, of course, screwed, riveted or otherwise secured to the upper face of the member 16 in the manner shown in Fig. 1.

Before concluding the description of this invention, it is desirable to mention the fact that while in the preferred embodiment of this invention the members 12 and 13 are constructed of wood, and are held in assembled relation by means of the metallic frame 21, they may, of course, be constructed of sheet metal without departing in any way from the spirit of this invention.

In reduction to practice, it has been found that the form of this invention illustrated in the drawings, and referred to in the above description as the preferred embodiment, is the most efficient and practical; yet realizing that the conditions concurrent with the adoption of this device will necessarily vary, it is desired to emphasize the fact that various minor changes in details of construction, proportion and arrangement of parts may be resorted to, when required, without sacrificing any of the advantages of this invention, as defined in the appended claims.

In conclusion, it may be well to state that if so desired the operating lever 30 and its associated mechanism may be dispensed with, and a draw cable employed in moving the step into folded or extended position if it is found that the particular type of car to which the step is applied is so constructed that it will be a costly operation to attach the operating mechanism.

What is claimed is:—

1. The combination with main steps, of an auxiliary extensible step including a pair of hanger rods pivotally secured to the main steps, a tread, and a riser carried by the hanger rods and fixed with respect to each other, yieldable means for normally holding the auxiliary step in folded position against the main steps, and manually operable means for moving the auxiliary step from folded to unfolded position.

2. The combination with main steps, of an auxiliary extensible step including a pair of pivoted hanger rods, a riser and a tread carried by the hanger rods and mounted in fixed relation to each other, a spring pulled lever operatively connected to the auxiliary step and acting to normally hold the step in folded position against the main steps.

3. The combination with main steps, of an auxiliary extensible step including a pair of pivotally mounted hanger rods, a riser and a tread carried by the hanger rods, an arm formed on one of the hanger rods, a crank link keyed on the hanger rods, a manually operable lever, a link connecting the crank link and lever, said lever being operable for moving the step from folded to unfolded position, or from unfolded to folded position, and a spring secured to the lever and acting to normally hold the auxiliary step in folded position.

4. The combination with main steps, of an auxiliary extensible step pivotally attached to the main steps, manually operable means for folding and unfolding the auxiliary step, yieldable means acting to normally hold the auxiliary step in folded position, and a clutch plate, whereby the step operating means may be held against movement when the step is in either folded or unfolded position.

5. The combination with main steps, of an auxiliary extensible step, including a tread and a riser mounted rigidly with respect to each other but adapted for swinging movement as an entirety, and yieldable means normally holding the tread and riser in folded position against the tread and riser of the adjacent step of the main steps.

6. The combination with main steps, of an auxiliary extensible step, including a pair of L-shaped hanger rods having their upper terminals bent at right angles and journaled on the lowermost tread member of the main steps, a riser and a tread rigidly mounted with respect to each other in the hanger rods, and yieldable means normally holding the auxiliary step in folded position, said step when in folded position having its riser and tread respectively bearing against a riser and tread of the main steps.

In testimony whereof I affix my signature in presence of two witnesses.

JAMES R. BARBER. [L. S.]

Witnesses:
J. J. CALHOUN,
H. N. VAN DEVANDER.

---

Copies of this patent may be obtained for five cents each, by addressing the "Commissioner of Patents, Washington, D. C."